(12) United States Patent
Pichler et al.

(10) Patent No.: US 10,971,981 B2
(45) Date of Patent: Apr. 6, 2021

(54) POSITION SENSOR AND METHOD FOR GENERATING A SENSOR OUTPUT SIGNAL

(71) Applicant: ams AG, Premstaetten (AT)

(72) Inventors: Michael Pichler, Dobl-Zwaring (AT); Gerald Wiednig, Stainz (AT)

(73) Assignee: AMS AG, Premstaetten (AT)

( * ) Notice: Subject to any disclaimer, the term of this patent is extended or adjusted under 35 U.S.C. 154(b) by 43 days.

(21) Appl. No.: 16/092,513

(22) PCT Filed: Apr. 5, 2017

(86) PCT No.: PCT/EP2017/058142
§ 371 (c)(1),
(2) Date: Oct. 10, 2018

(87) PCT Pub. No.: WO2017/178304
PCT Pub. Date: Oct. 19, 2017

(65) Prior Publication Data
US 2019/0089234 A1 Mar. 21, 2019

(30) Foreign Application Priority Data
Apr. 13, 2016 (EP) ..................................... 16165101

(51) Int. Cl.
*H02K 29/08* (2006.01)
*H02P 6/16* (2016.01)
(Continued)

(52) U.S. Cl.
CPC .............. *H02K 29/08* (2013.01); *G01D 5/145* (2013.01); *G01D 5/24452* (2013.01);
(Continued)

(58) Field of Classification Search
CPC ...... H02K 29/08; H02K 11/215; G01D 5/145; G01D 18/008; H02P 6/10
See application file for complete search history.

(56) References Cited

U.S. PATENT DOCUMENTS 7,885,785 B1    2/2011 Pekarek et al.
2010/0090633 A1  4/2010 Deller et al.
(Continued)

FOREIGN PATENT DOCUMENTS

DE          10213381 A1 * 10/2003  ............. G01D 5/145
DE     10 2011 105502       1/2012
(Continued)

OTHER PUBLICATIONS

Datasheet "AS5047D—14-bit On-Axis MagneticRotary Position Sensor with 11-bit Decimal & Binary incremental Pulse Count", Product of ams AG; [v1-04] Oct. 31, 2014.
(Continued)

*Primary Examiner* — Said Bouziane
(74) *Attorney, Agent, or Firm* — MH2 Technology Law Group LLP

(57) ABSTRACT

A position sensor (10) comprise at least a magneto sensitive element (11-14), a signal evaluation unit (16) that is coupled to the at least one magneto sensitive element (11-14) and is configured to generate an measurement signal (SM), an output stimulation unit (17) configured to generate a set signal (ST) and an interface unit (18) that is coupled at its input side to the signal evaluation unit (16) and the output stimulation unit (17). The interface unit (18) is configured to provide a sensor output signal (SOUT) depending on the measurement signal (SM) in a measurement mode of operation and depending on the set signal (ST) in a calibration mode of operation.

15 Claims, 5 Drawing Sheets

(51) Int. Cl.
*G01D 18/00* (2006.01)
*G01D 5/244* (2006.01)
*G01D 5/14* (2006.01)
*H02P 6/08* (2016.01)
*H02P 6/10* (2006.01)

(52) U.S. Cl.
CPC ........... *G01D 18/008* (2013.01); *H02P 6/085* (2013.01); *H02P 6/10* (2013.01); *H02P 6/16* (2013.01)

(56) References Cited

U.S. PATENT DOCUMENTS

| | | | | |
|---|---|---|---|---|
| 2016/0111986 | A1* | 4/2016 | Vollmer | H02K 11/27 318/400.23 |
| 2016/0169717 | A1* | 6/2016 | Zhitomirsky | G01D 5/20 702/94 |
| 2017/0307696 | A1* | 10/2017 | Werth | G01R 33/07 |

FOREIGN PATENT DOCUMENTS

| | | |
|---|---|---|
| DE | 10 2013 212903 | 1/2015 |
| WO | 2012/003825 | 1/2012 |
| WO | 2015/000638 | 1/2015 |

OTHER PUBLICATIONS

Datasheet "AS5047P; 14-bit On-AxisMagnetic Rotary Position Sensor with 12-Bit Decimal & Binary incremental Pulse Count for 28krpm high speed capability" Product of ams AG; [v1-00], Oct. 31, 2014.
Datasheet "AS5147; 14-Bit On-AxisMagnetic Rotary Position Sensor with 11-bit Binary incremental Pulse Count" Product of ams AG; [v1-06], Oct. 31, 2014.
Datasheet "AS5147P; 14-Bit On-AxisMagnetic Rotary Position Sensor with 12-Bit Binary Incremental Pulse Count and for 28krpm High Speed Capability" Product of ams AG; [v1-01], May 12, 2015.
Datasheet "AS5247; 14-Bit Dual-Die On-Axis MagneticRotary Position Sensor with 11-Bit Binary Incremental PulseCount" Productof ams AG; [v1-09] Sep. 24, 2015.
Datasheet "ECN/ERN 400 series", Dr. Johannes Heidenhain GmbH; www.heidenhain.de; Sep. 2015.
Datasheet "mcDSA-E25" miControlCID GmbH;Article No. 1505721; V1 .02.00.12; 2014.
Datasheet "NI USB-8451" National Instruments; 2005.
Datasheet "USB-8451 OEM" National Instruments; Jan. 2006.
SD4Y Programmer—Programming Procedure; for the AMS AS5xxx Revision Series, SD4Y—SmartDesign4you 1.8-Jan. 28, 2015.
European Patent Office, International Search Report for PCT/EP2017/058142 dated May 9, 2017.

\* cited by examiner

Phase 1

Phase 2

Phase 3

Phase 4

Phase 5

Phase 6

Phase 1

Phase 2

Phase 3

Phase 4

Phase 5

Phase 6

POSITION SENSOR AND METHOD FOR GENERATING A SENSOR OUTPUT SIGNAL

BACKGROUND OF THE INVENTION

The present disclosure is related to a position sensor, a motor arrangement and a method for generating a sensor output signal.

Position sensors are often used to detect a position of a motor, especially of a rotor of a motor. In the case of a linear motor, a linear position is detected by the position sensor and in the case of a rotating motor, an angle position is detected by the position sensor.

The angle position has to be determined for the control of an electric commutated motor, abbreviated EC motor, such as a brushless direct current motor, abbreviated BLDC motor, or a permanent magnet synchronous motor, abbreviated PMSM. The EC motor is basically an absolute system within one rotor pole pair. A position sensor also provides an absolute angle output in relation to the mechanical position of the motor shaft. The position sensor is used as position feedback for the regulation of the motor. Since the position sensor is used as a feedback sensor for the motor shaft position, an alignment of the angular domains is required which is called "zero angle programming". This zero angle is different from system to system and must be determined or programmed in the production line for fabricating the motor.

SUMMARY OF THE INVENTION

In an embodiment, a position sensor comprises at least a magneto sensitive element, a signal evaluation unit, an output stimulation unit and an interface unit. The signal evaluation unit is coupled to the at least one magneto sensitive element. The signal evaluation unit is configured to generate a measurement signal. The output stimulation unit is configured to generate a set signal. The interface unit is coupled at its input side to the signal evaluation unit and the output stimulation unit. The interface unit is configured to provide a sensor output signal depending on the measurement signal in a measurement mode of operation and depending on the set signal in a calibration mode of operation.

Advantageously, the position sensor is able to provide not only the measurement signal but also the set signal via the interface unit. In the calibration mode of operation, a position of a motor can be set by the sensor output signal that depends on the set signal. Since the position of the motor is known, a calibration of the position sensor such as a zero angle calibration can be performed. In the measurement mode of operation, the sensor output signal that is a function of the measurement signal can be used as a feedback to the motor for controlling the position of the motor.

In an embodiment, the position sensor comprises a semiconductor body. The at least one magneto sensitive element, the signal evaluation unit, the output stimulation unit and the interface unit are realized on a first main surface of the semiconductor body.

In an embodiment, the interface unit comprises a multiplexer having a first input coupled to the signal evaluation unit and a second input coupled to the output stimulation unit.

In an embodiment, an output of the multiplexer is coupled to an interface of the interface unit.

In an alternative embodiment, the output of the multiplexer is coupled to the interface of the interface unit and to a further interface of the interface unit.

In an embodiment, the interface is realized as an element of a group consisting of an incremental interface, an absolute interface and a pulse-width modulator decoder.

In case the interface unit comprises the interface and the further interface, the interface and the further interface can be implemented as two elements of said group.

The incremental interface may generate the sensor output signal in the form of incremental sensor output signals. Typically, the incremental output signals may be realized as three signals, called A B I signals.

The absolute interface may generate the sensor output signal in the form of absolute sensor output signals. Typically, the absolute sensor output signals may be implemented as three signals, called U V W signals.

The pulse-width modulator decoder may generate the sensor output signal in the form of a pulse-width modulated signal. Typically, the pulse-width modulator signal may be a single signal.

In an embodiment, the position sensor comprises a serial peripheral interface, abbreviated SPI. The SPI is coupled to a bus terminal of the position sensor. Furthermore, the SPI is coupled to the output stimulation unit. The output stimulation unit determines the set signal depending on information received from the bus terminal via the SPI.

In an embodiment, the at least one magneto sensitive element is implemented as an element out of a group consisting of a Hall element, a magneto-diode, a magneto-transistor, an anisotropic magneto resistance element, a giant magneto resistance element, a tunneling magneto resistance element and a colossal magneto resistance element.

In an embodiment, the position sensor comprises a memory. The memory may be realized as a read-only memory, abbreviated ROM, a programmable read only memory, abbreviated PROM, an electrically erasable programmable read-only memory, abbreviated EEPROM or a one-time programmable memory, abbreviated OTP.

In an embodiment, the memory may be coupled to the output stimulation unit. The output stimulation unit determines the set signal depending on set data stored in the memory. The memory may receive the set data from the bus terminal via the SPI. There may be a large time difference between receiving the set data by the memory and providing the set data by the memory to the output stimulation unit. The memory may have a set data block that stores the set data.

In an embodiment, the signal evaluation unit comprises a linearization unit that is coupled on its output side to the interface unit. The linearization unit is coupled on its input side to the at least one magneto sensitive element. For example the signal evaluation unit may comprise an analog-to-digital converter arranged between the at least one magneto sensitive element and the linearization unit.

In an embodiment, the memory is coupled to the linearization unit. The memory may comprise a calibration data block that stores calibration data. The memory provides calibration data to the linearization unit in the measurement mode of operation. The linearization unit generates the measurement signal depending on the calibration data. Thus, the linearization unit generates the measurement signal with the value zero for one single position of the position sensor to the motor that was determined in the calibration mode of operation. In addition, the linearization unit reduces errors in the measurement signal by the use of the calibration data.

In an embodiment, the position sensor stores the calibration data in the calibration data block of the memory in the calibration mode of operation. The OTP or EEPROM may be programmed in the calibration mode of operation.

In an embodiment, the calibration data is determined in the calibration mode of operation in such a manner that the measurement signal represents a zero position in the measurement mode of operation at a single alignment between the position sensor and a device. The position of the device is to be measured in the measurement mode of operation. For any point of time in the measurement mode of operation at which the position sensor and the device are arranged to each other at this single alignment, the signal evaluation unit generates the measurement signal with the value representing the zero position.

In an embodiment, the position sensor is realized as a linear position sensor. The zero position is a position with the value zero on a linear axis. The position of the device on the linear axis can be measured in the micrometer, millimeter, centimeter or meter range.

In an alternative embodiment, the position sensor is implemented as an angle position sensor. The zero position is the angle with the value zero. The position may be measured in degrees or in fractions of a complete turn.

The at least one magneto sensitive element generates at least one magnetic signal. The magnetic signal may be an analog signal related to a magnetic flux at the location of the magneto sensitive element.

In an embodiment, the linearization unit provides the measurement signal by linearization of an input signal of the linearization unit using the calibration data. The input signal of the linearization unit depends on the at least one magnetic signal. The input signal of the linearization unit is a digital signal and may depend on a digital output signal of the analog-to-digital converter arranged between the at least one magneto sensitive element and the linearization unit. Thus, the linearization unit provides the linearized measurement signal with a value representing the zero position at the single alignment of the position sensor and the device. By the linearization, errors in the measurement signal are reduced. Such errors may result from a non-ideal orientation of the device and the position sensor such as, for example, a non-ideal orientation of a rotating axis of a rotating device to the surface of the position sensor. The error may be e.g. symmetric due to the additional offset calculation. Advantageously, a linearization of the sensor output signal within the position sensor can be performed.

In an embodiment, the data stored in the memory is not changed in the measurement mode of operation.

In an embodiment, the position sensor comprises a digital circuit that is coupled to the memory. The digital circuit determines the calibration data in the calibration mode of operation and stores the calibration data in the calibration data block of the memory in the calibration mode of operation. The digital circuit may be realized as an element of a group comprising a microcontroller, a microprocessor and a state machine.

In an alternative embodiment, a programmer unit is coupled to the position sensor via the bus terminal and the SPI. The programmer unit calculates the calibration data during the calibration mode of operation using signals received via the bus terminal. After calculation, the programmer unit stores the calibration data in the memory via the bus terminal.

In an embodiment, the programmer unit comprises a further semiconductor body. The semiconductor body that comprises the position sensor is free from the programmer unit. The programmer unit is realized as a block or device that is external to the position sensor.

In an embodiment, the programmer unit is connected to the position sensor during the calibration mode of operation. The programmer unit may be used for an end of line process. The end of line process comprises the calibration mode of operation and optionally further tests. The programmer unit may not be connected to the position sensor during the measurement mode of operation.

In an embodiment, a motor arrangement comprises the position sensor. Additionally, the motor arrangement comprises a motor having a rotor and a stator and an encoder magnet mechanically coupled to the rotor. The encoder magnet generates a magnetic field for the position detection by the position sensor. Moreover, the motor arrangement comprises a motor controller electrically coupled to the stator. The position sensor is arranged in the magnetic field of the encoder magnet. Additionally, the position sensor is electrically coupled to the motor controller. The position sensor provides the sensor output signal to the motor controller.

In an embodiment, the motor controller comprises an additional semiconductor body. The semiconductor body that comprises the position sensor is free from the motor controller. The motor controller may be realized as a further block or device that is external to the position sensor.

The at least one magneto sensitive element measures the magnetic field of the encoder magnet. The magnetic field may have a component perpendicular to the at least one magneto sensitive element.

In an embodiment, the at least one magneto sensitive element only measures the component of the magnetic field that is perpendicular to the at least one magneto sensitive element.

Advantageously, the encoder magnet and the position sensor are able to provide a feedback between the motor and the motor controller. By this feedback, the motor controller receives information about the position of the motor, especially of the rotor of the motor. Said information is provided by the sensor output signal. Additionally, in the calibration mode of operation, a position of the motor is set, since the sensor output signal is a function of the set signal in the calibration mode of operation.

The stator may comprise a first number N of poles. Each pole comprises a coil or winding. The motor controller controls the current flowing through the coils or windings of each of the first number N of poles.

The position sensor may be realized as an angle position sensor, magnetic position sensor or as a magnetic rotary encoder for a motor control application.

The motor arrangement may allow a manual and sequential adjustment of the position sensor to the motor. First, the position sensor may be manually fixed to the motor. Sequentially, the zero angle is adjusted in the calibration mode of operation. After a phase with the calibration mode of operation, the measurement of the sensor output signal representing an angle information is performed in the measurement mode of operation.

In an embodiment, first the motor arrangement is set in a phase with the calibration mode of operation and then set in at least one phase with the measurement mode of operation. Several phases with the measurement mode of operation are possible separated by idle phases. The phase with the calibration mode of operation may be called calibration phase and may be required only once. A further phase with the calibration mode of operation may be required e.g. after a repair of the motor arrangement.

The motor arrangement relates to the field of motor control applications and the implementation of an angle position sensor in an electric commutated motor, abbreviated EC-motor, such as a BLDC or PMSM. An EC-motor is basically an absolute system within one rotor pole pair. The position sensor also provides an absolute angle output in relation to the mechanical position of the motor axis that can also be named motor shaft. Since the position sensor is used as a feedback sensor for the motor shaft position, an alignment of the angular domains (called zero angle programming) has to be performed by the calibration mode of operation. This zero angle is different from motor arrangement to motor arrangement and is programmed in the production line of a motor manufacturer. By the use of the calibration mode of operation, a significant simplification of the zero angle alignment process between the position sensor, the transmitter or encoder magnet and the motor shaft is achieved.

In the calibration mode of operation, constant currents are forced through the motor windings by the motor controller. Thus, the rotor of the motor will stick in a defined angle position which provides the information for the zero angle alignment. No additional current sources and connection hardware are required.

The alignment procedure of the motor arrangement is done directly in the real application and in combination with the complete configured motor controller unit. The sensor output signal (e.g. provided via an incremental and/or an absolute interface) can be set to any state via a digital interface. Any angle position can be emulated within the position sensor and the motor controller is stimulated directly via the position sensor. As a result, the alignment of the position sensor and motor zero angle can be done in the real application. Forcing the motor currents is handled directly by the motor controller. No additional equipment is required. Zero angle calibration can be done in one step during an end of line test. The position sensor, the motor controller and the motor are tested in one step during the calibration phase. Noise effects are cancelled out due to multiple readings of angular values and subsequent averaging. In an embodiment, a multipoint calibration is performed and, thus, additional information about system accuracy is given.

In an embodiment, a method for generating a sensor output signal comprises the generation of at least a magnetic signal by at least a magneto sensitive element. Moreover, a measurement signal is generated by a signal evaluation unit as a function of the at least one magnetic signal. Moreover, a set signal is provided by an output stimulation unit. Additionally, a sensor output signal is provided by an interface unit. The sensor output signal depends on the measurement signal in a measurement mode of operation and depends on the set signal in a calibration mode of operation.

Thus, the sensor output signal can be either used for providing the measurement signal which contains a position information or to provide a set signal, for example to a motor controller coupled to the interface unit.

In an embodiment, the at least one magneto sensitive element, the signal evaluation unit, the output stimulation unit and the interface unit are realized on a first main surface of a semiconductor body. A position sensor comprises the semiconductor body that contains the at least one magneto sensitive element, the signal evaluation unit, the output stimulation unit and the interface unit.

BRIEF DESCRIPTION OF THE DRAWINGS

The following description of figures of exemplary embodiments may further illustrate and explain aspects of the invention. Devices and circuit blocks with the same structure and the same effect, respectively, appear with equivalent reference symbols. In so far as devices or circuit blocks correspond to one another in terms of their function in different figures, the description thereof is not repeated for each of the following figures.

DETAILED DESCRIPTION

Figure 1:
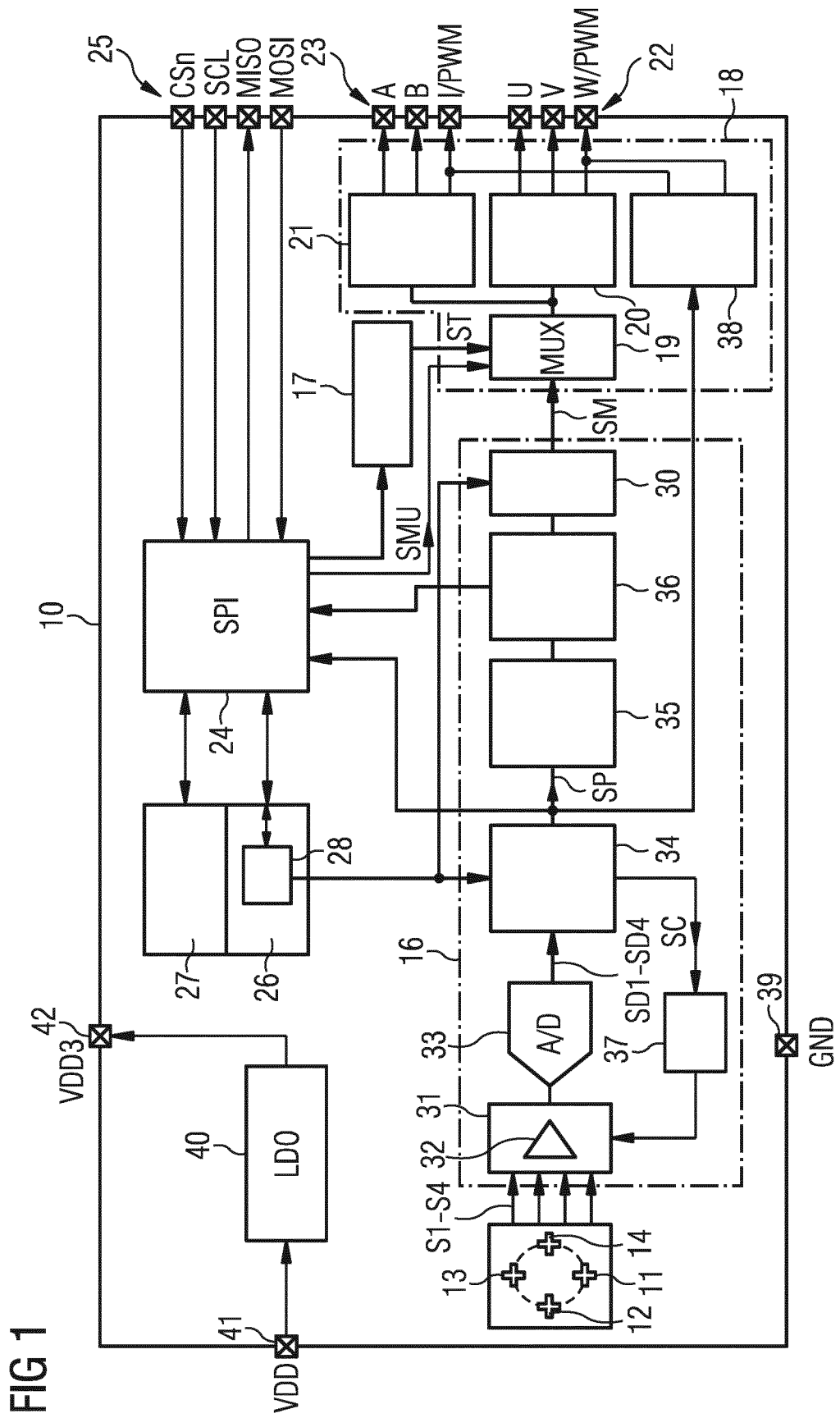
FIG. 1 shows an exemplary embodiment of a position sensor.

FIG. 1 shows an exemplary embodiment of a position sensor 10. The position sensor 10 comprises at least one magneto sensitive element 11. The at least one magneto sensitive element 11 may be realized as a Hall element such as a lateral Hall element. The position sensor 10 may comprise a number M of magneto sensitive elements 11 to 14. In the embodiment shown in FIG. 1, the number M is 4. The four magneto sensitive elements 11 to 14 may be arranged in a circle. The four magneto sensitive elements 11 to 14 are arranged in a regular manner.

The position sensor 10 comprises a signal evaluation unit 16 that is coupled on its input side to the at least one magneto sensitive element 11. Thus, the number M of magneto sensitive elements 11 to 14 are electrically connected to the signal evaluation unit 16. The position sensor 10 comprises an output stimulation unit 17 and an interface unit 18. The interface unit 18 is coupled at a first input to the signal evaluation unit 16 and at a second input to the output stimulation unit 17.

The interface unit 18 comprises a multiplexer 19. A first input of the multiplexer 19 is coupled to the output of the signal evaluation unit 16. A second input of the multiplexer 19 is coupled to the output of the output stimulation unit 17. The interface unit 18 comprises an interface 20 having an input coupled to an output of the multiplexer 19. The interface unit 18 may comprise a further interface 21 having an input that is also coupled to the output of the multiplexer 19. The interface 20 may be realized as an absolute interface. The interface 20 is connected on its output side to an output terminal 22. The further interface 21 may be realized as an incremental interface. The further interface 21 is connected on its output side to a further output terminal 23. The interface unit 18 comprises a pulse-width modulator decoder 38 coupled to the output terminal 22 and/or the further output terminal 23.

Moreover, the position sensor 10 comprises a serial peripheral interface 24, abbreviated as SPI. A bus terminal 25 of the position sensor 10 is connected to the SPI 24. The bus terminal 25 is implemented as a bidirectional terminal. The SPI 24 is connected to an input of the output stimulation unit 17. Moreover, the SPI 24 may be coupled to a control input of the multiplexer 19.

Additionally, the position sensor 10 comprises a memory 26. The memory 26 may be realized as a one-time programmable memory or an EEPROM. Furthermore, the position sensor 10 comprises a volatile memory 27. The volatile memory 27 may be implemented as a random access memory such as a static random access memory, abbreviated SRAM, or a dynamic random access memory, abbreviated DRAM. The memory 26 and the volatile memory 27 are each coupled to the SPI 24.

The signal evaluation unit 16 comprises a linearization unit 30. The linearization unit 30 is connected on its output side to the first input of the multiplexer 19. The linearization unit 30 is coupled on its input side to the at least one magneto sensitive element 11 to 14.

Furthermore, the signal evaluation unit 16 comprises an analog frontend circuit 31 which is connected on its input side to the at least one magneto sensitive element 11 to 14. The analog frontend circuit 31 comprises an amplifier 32. Moreover, the analog frontend circuit 31 may comprise not-shown filters.

Additionally, the signal evaluation unit 16 comprises an analog-to-digital converter 33 that is coupled on its input side via the analog frontend circuit 31 to the at least one magneto sensitive element 11 to 14. The signal evaluation unit 16 comprises a position calculation unit 34. An output of the analog-to-digital converter 33 is coupled to an input of the position calculation unit 34. The position calculation unit 34 is realized as a coordinate rotating digital computer block, abbreviated CORDIC. The position calculation unit 34 is also called digital processing unit. The digital processing unit 34 may be implemented as a state machine, microprocessor or microcontroller. The digital processing unit 34 is coupled via an automatic gain control circuit 37 to a control input of the analog frontend circuit 31.

Additionally, the signal evaluation unit 16 comprises an interpolator 35 coupled on its input side to an output of the digital processing unit 34. Furthermore, the signal evaluation unit 16 may comprise an error compensation unit 36 that is coupled on its input side to an output of the interpolator 35. The error compensation unit 36 is implemented for dynamic angle error compensation. An output of the error compensation unit 36 is coupled to an input of the linearization unit 30.

A set data block 29 of the memory 26 is coupled to the output stimulation unit 17 via the SPI 24 or directly via a not shown connection. A calibration data block 28 of the memory is coupled to the linearization unit 30. Said block may also be coupled to the digital processing unit 34. The digital processing unit 34 is coupled to the SPI 24. Additionally, the digital processing unit 34 is coupled to the pulse-width modulator decoder 38.

Moreover, the position sensor 10 comprises a low drop regulator 40. The low drop regulator 40 connects a first supply terminal 41 to a second supply terminal 42 of the position sensor 10. The position sensor 10 may comprise a reference potential terminal 39. The connections of the reference potential terminal 39 and of the low drop regulator 40 to the different circuit parts are not shown in FIG. 1.

The at least one magneto sensitive element 11 provides at least one magnetic signal S1 to the analog frontend circuit 31. Thus, the number M of magneto sensitive elements 11 to 14 generate the number M of magnetic signals S1 to S4. In the embodiment shown in FIG. 1, the position sensor 10 comprises four magneto sensitive elements 11 to 14 which generate four magnetic signals S1 to S4. Each of the number M of magnetic signals S1 to S4 is provided to the analog frontend circuit 31. After amplification and filtering the analog frontend circuit 31 provides four amplified magnetic signals to the input of the analog-to-digital converter 33. Each of the at least one magnetic signal S1 to S4 are separately converted into a digital magnetic signal SD1 to SD4. Thus, the at least one magnetic signal S1 to S4 is converted into the at least one digital magnetic signal SD1 to SD4 by the analog frontend 31 and the analog-to-digital converter 33.

The at least one digital magnetic signal SD1 to SD4 is provided to the digital processing unit 34. The digital processing unit 34 generates a position signal SP depending on the at least one digital magnetic signal SD1 to SD4. The digital processing unit 34 may use an arctangent function with the at least one digital magnetic signal SD1 to SD4 as inputs to calculate the position signal SP. The position signal SP is a digital signal and comprises a position information. The position signal SP may comprise an angle information. The digital processing unit 34 also generates a control signal SC that is provided via the automatic gain control circuit 37 to a control input of the analog frontend circuit 31. In case a not-shown encoder magnet 50 has a distance to the at least one magneto sensitive element 11 to 14 that is larger than a predetermined value, the automatic gain control circuit 37 increases an amplification factor of the amplifier 32 of the analog frontend circuit 31.

The position signal SP is provided via the interpolator 35 and the error compensation unit 36 to the linearization unit 30. The linearization unit 30 generates a measurement signal SM. The measurement signal SM is provided to the first input of the multiplexer 19.

The at least one magneto sensitive element 11 to 14 may convert the magnetic field component perpendicular to the surface of the position sensor 10 into the at least one magnetic signal S1 to S4 that may be a voltage. The at least one magnetic signal S1 to S4 from the at least one magneto sensitive element 11 to 14 is amplified and filtered by the analog frontend 31 for being converted by the analog-to-digital converter 33 into the at least one digital magnetic signal SD1 to SD4 that is a digital signal. The at least one digital magnetic signal SD1 to SD4 is processed by the digital processing unit 34 to compute an angle and magnitude of the magnetic vector. The magnitude of the magnetic vector is a function of the intensity of the magnetic field measured by the at least one magneto sensitive element 11 to 14 and is used by the automatic gain control circuit 37 to adjust the amplification level of the analog frontend circuit 31 for compensation of the temperature and magnetic field variations.

The interpolator 35 generates missing values of the position signal SP in case of a high speed rotation. The error compensation unit 36 is implemented as a dynamic error compensation block and corrects the position signal SP for latency using prediction calculation algorithm. The position signal SP represents the information about a calculated angle α. The linearization unit 30 uses calibration data or calibration points stored in the calibration data block 28 of the memory 26 to generate the measurement signal SM with correct zero value and with a reduced error in comparison to the position signal SP.

The interface unit 18 provides a sensor output signal SOUT. The interface 20 generates an absolute sensor output signal, comprising three signals U, V, W. The further interface 21 generates an incremental sensor output signal, comprising three signals A, B, I. The position signal SP is provided to the pulse-width modulation decoder 38. The pulse-width modulator decoder 38 generates a pulse-width modulated signal PWM that is provided to the output terminal 20 and/or the further output terminal 23.

The sensor output signal SOUT is realized as an absolute output signal, having the signals U, V, W, and/or an incremental sensor output signal, having the signals A, B, I and/or a pulse-width modulated signal PWM. The output terminal 22 has three pins. Correspondingly, the further output terminal 23 also comprises three pins. The pulse-width modulated signal SW may be provided by one of the pins of the output terminal 22 or by one of the pins of the further output terminal 23.

In a measurement mode of operation, the measurement signal SM is provided by the multiplexer 19 to the interface 20 and the further interface 21. Thus, the sensor output signal SOUT is a function of the measurement signal SM in the measurement mode of operation. At higher speeds, the interpolator 35 fills in missing pulses in the incremental output signal A, B, I.

The bus terminal 25 may comprise four pins. Three of the four pins may be realized as input pins for providing input signals CSn, SCL, MOSI to the SPI 24. One of the four pins of the bus terminal 25 may be implemented as an output pin for providing an input signal MISO generated by the SPI 24 to another device.

Non-volatile settings of the position sensor 10 can be programmed through the bus terminal 25 and the SPI 24. The SPI 24 is implemented as a slave.

In a calibration mode of operation, the output stimulation unit 17 generates a set signal ST to the second input of the multiplexer 19. Thus, the sensor output signal SOUT is a function of the set signal ST in the calibration mode of operation. The absolute sensor output signal U, V W and the incremental sensor output signal A, B, I are a function of the set signal ST in the calibration mode of operation.

The SPI 24 generates a multiplexer control signal SMU that is provided to the control terminal of the multiplexer 19. The multiplexer control signal SMU has a first logical value in the calibration mode of operation and a second logical value in the measurement mode of operation. The multiplexer control signal SMU may be generated as a function of a signal received from the SPI 24 by the bus terminal 25. The multiplexer control signal SMU determines whether the set signal ST or the measurement signal SM is provided to the interface 20 and/or the further interface 21.

The position sensor 10 comprises a semiconductor body. The at least one magneto sensitive element 11 to 14, the signal evaluation unit 16, the output stimulation unit 17 and the interface unit 18 are realized on a first main surface of the semiconductor body. Thus, FIG. 1 shows the circuits on said surface.

Advantageously, the position sensor 10 is realized as an intelligent sensor. The integration of the at least one magneto sensitive element 11 to 14, the signal evaluation unit 16, the output stimulation unit 17 and the interface unit 18 on the first main surface of the semiconductor body results in high performance, high safety, low area and low cost of the position sensor 10. Due to the small size, the position sensor 10 may be arranged very near to a not-shown encoder magnet 50. The position sensor 10 may be simple to use for an applicant. The position sensor 10 may only comprise digital interfaces. The position sensor 10 may be free of any analog interface.

In FIG. 1, a diagram or an integrated circuit design of the position sensor 10 is illustrated. The position sensor 10 may be realized as a motor control magnetic angular sensor having blocks for zero angle alignment.

Figure 3:
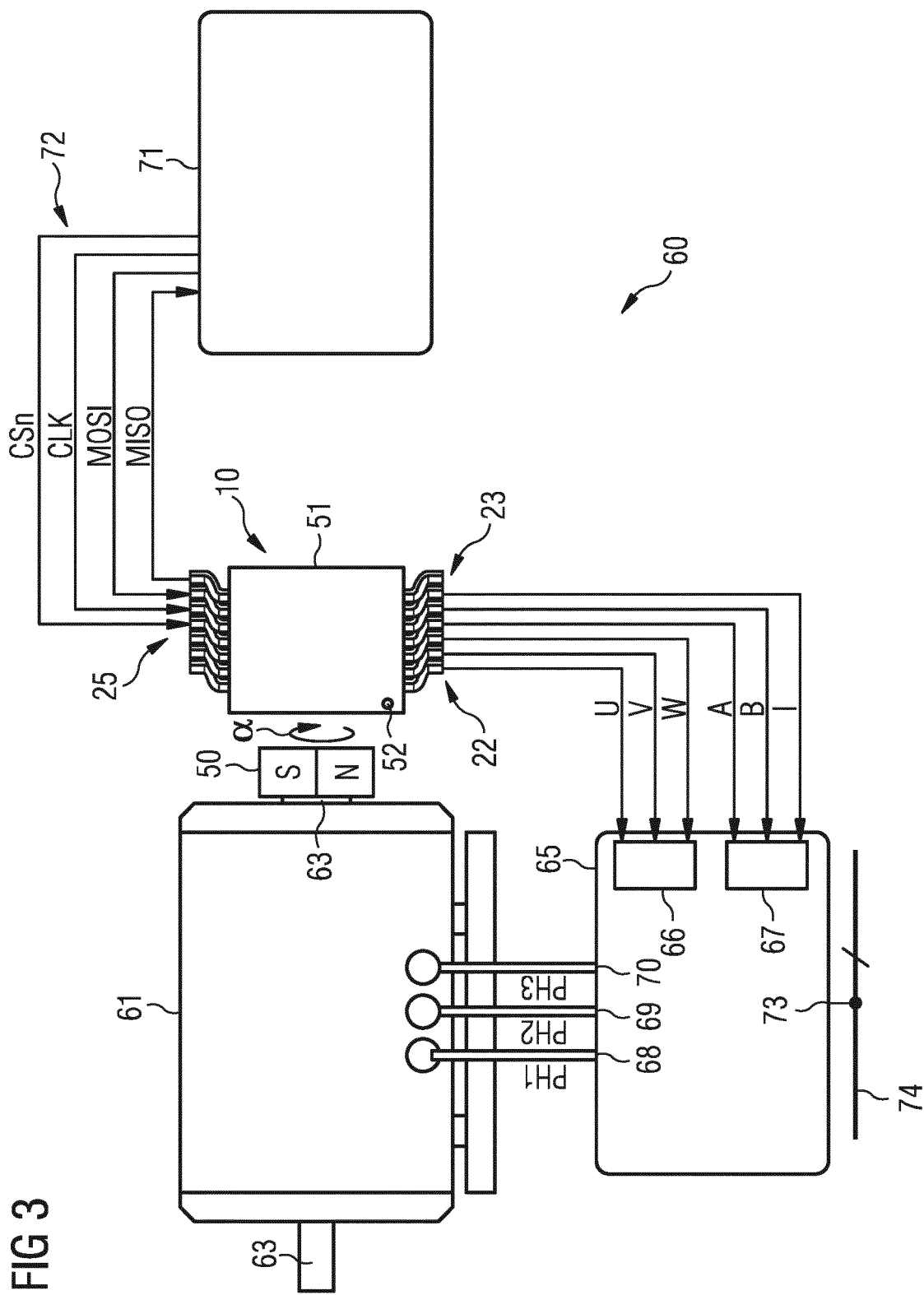
FIG. 3 shows an exemplary embodiment of a motor arrangement with a position sensor.
Figure 4A:
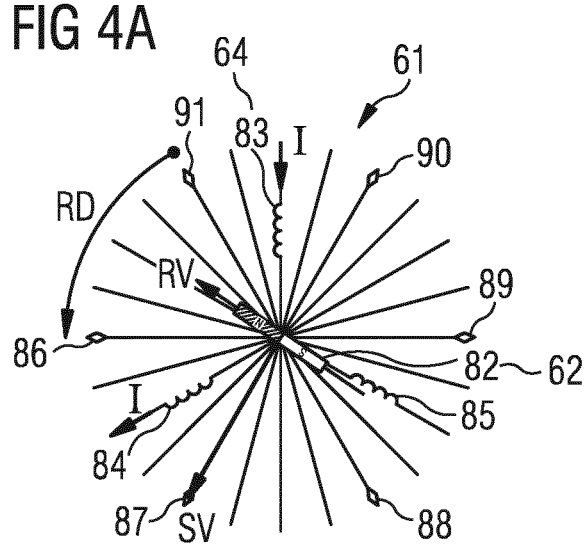
FIGS. 4A and 4B show details of a motor arrangement.
Figure 4A:
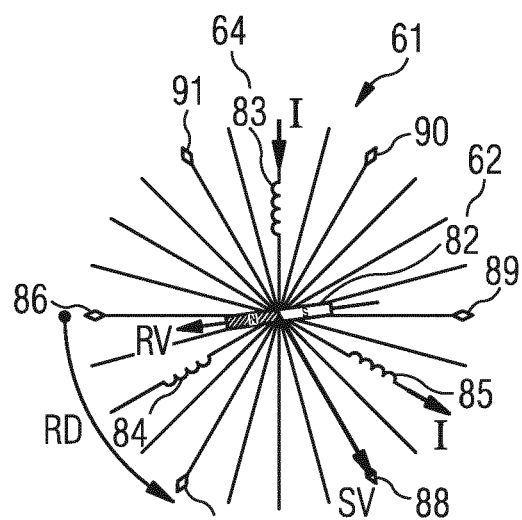
Figure 4A:
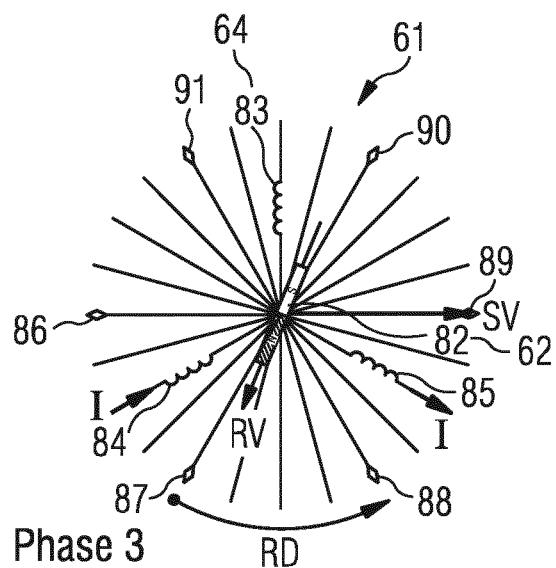
Figure 4A:
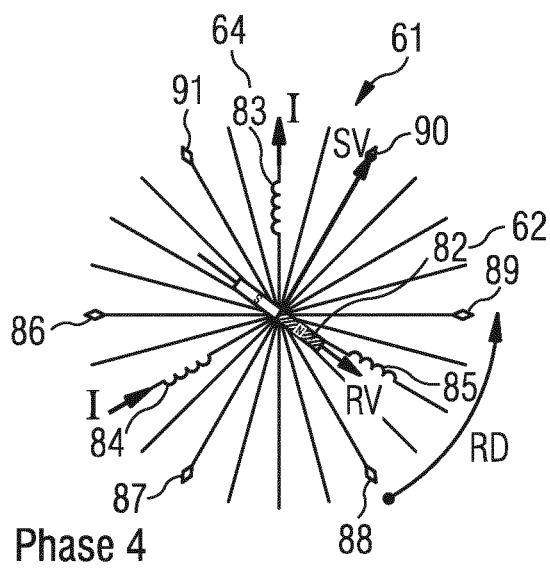
Figure 4A:
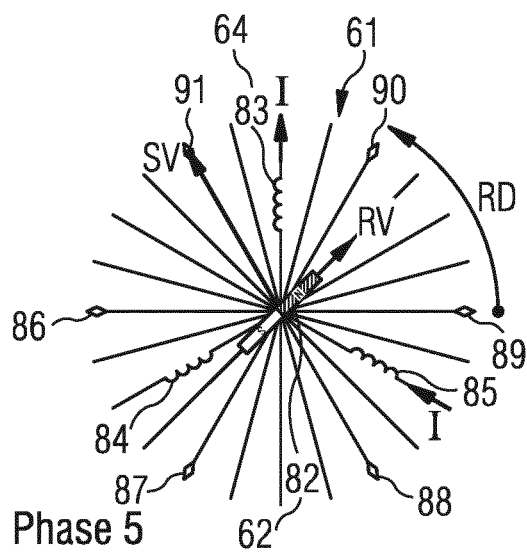
Figure 4A:
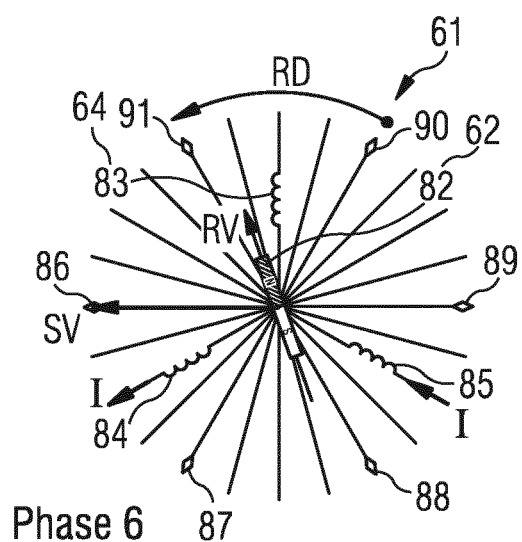
Figure 4B:
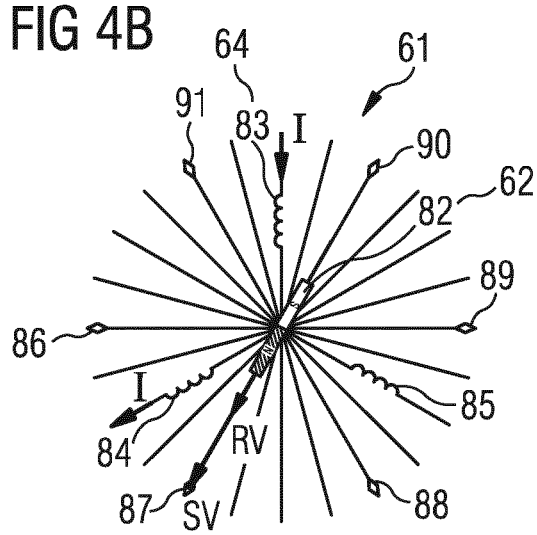
Figure 4B:
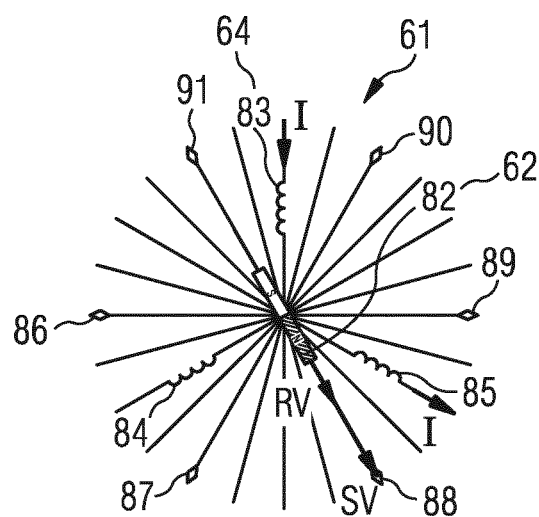
Figure 4B:
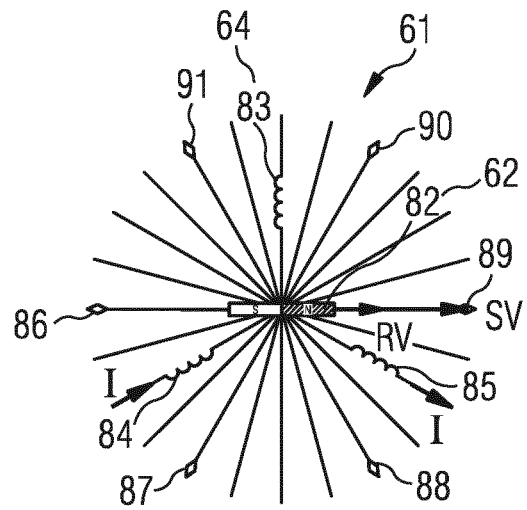
Figure 4B:
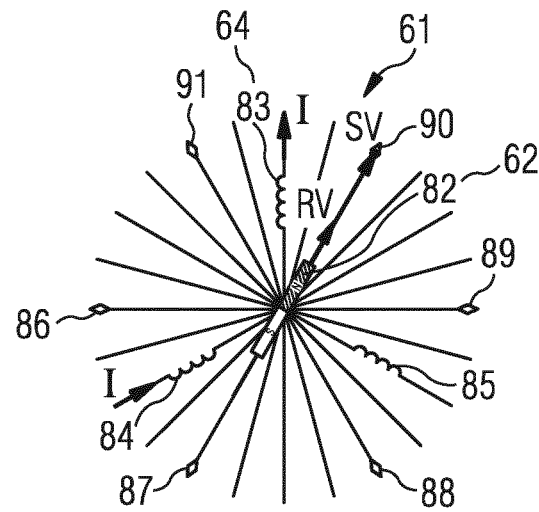
Figure 4B:
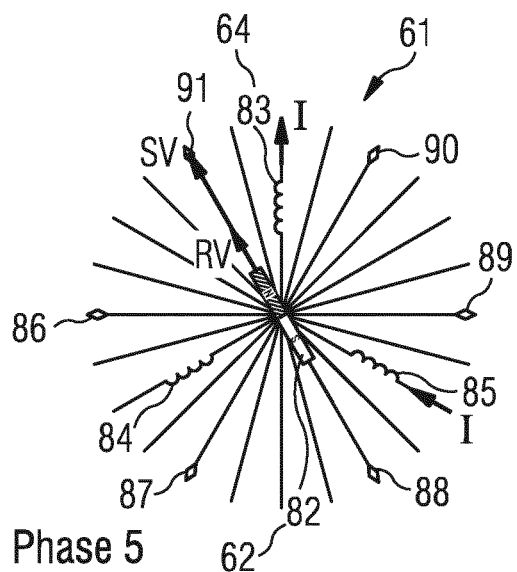
Figure 4B:
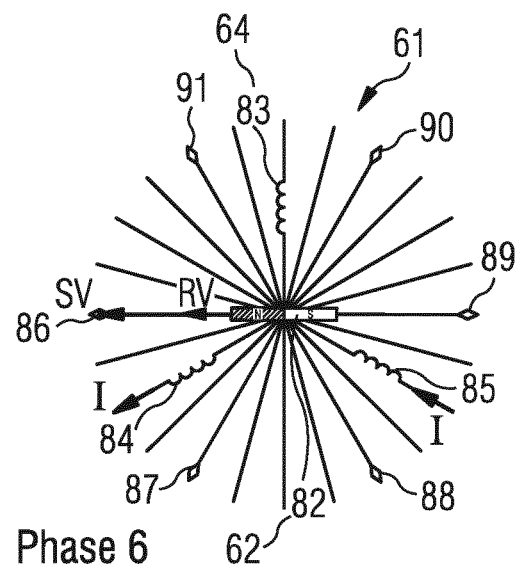

The output stimulation unit 17 and the multiplexer 19 enable the control of the sensor output signal SOUT externally. The normal angular measurement function is still present and the measured raw angle, e.g. the position signal SP, can be read via the SPI 24. During this zero angle calibration phase, a motor 61 as shown in FIGS. 3, 4A and 4B can step through several discrete angular points. By an appropriate current regulation, the rotor 62 may be forced to several calibration points. The number of calibration points may be the number of rotor pole pairs, abbreviated R, times six. E.g. a motor 61 with four R may have 24 calibration points. Alternatively, the minimum number of calibration points may be the number of R times six.

In an embodiment, the calibration points are saved within the position sensor 10 itself (e.g. in the memory 26 realized as OTP). Thus, it is also possible to implement a linearization algorithm inside the integrated circuit of the position sensor 10. In this case, the position sensor 10 is optimally aligned to every switching point of the motor 61 which gives an increase of efficiency, reduction of torque ripple and reduction of acoustic noise. Additionally, the requirements regarding the encoder magnet selection, the mechanical alignment (e.g. of the encoder magnet 50 to the position sensor 10) and the mounting of the encoder magnet 50 will be relaxed, if the linearization is done.

In an embodiment, not shown, the position sensor 10 comprises a digital circuit that is coupled to the memory 26 and determines and stores the calibration data in the calibration data block 28 of the memory 26 in the calibration mode of operation. The position sensor 10 runs through the calibration routine by itself, just triggered by an initial command. The digital circuit may be a microprocessor, microcontroller or state machine. Minimum effort for the user and best control performance of the motor 61 is the beneficial point.

In an alternative embodiment, not shown, the position sensor 10 comprises another number of magneto sensitive elements 11 as the number four of magneto sensitive elements 11 shown in the embodiment of FIG. 1.

In an alternative embodiment, not shown, the interface unit 14 comprises only one interface, for example the interface 20 or the further interface 21. In that case, the sensor output signal SOUT only comprises the absolute sensor output signal U, V, W or the incremental sensor output signal A, B, I.

Figure 2A:
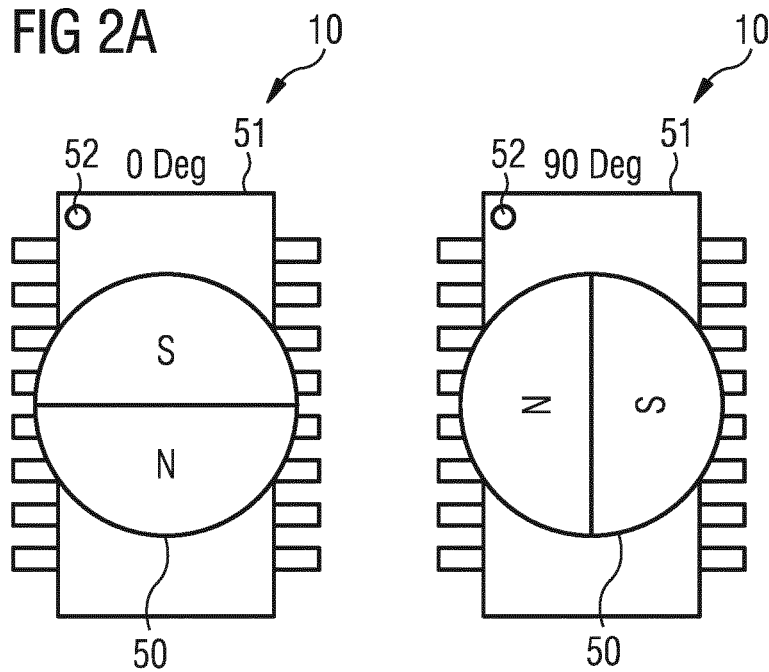
FIGS. 2A and 2B shows an exemplary embodiment of a position sensor with an encoder magnet and an exemplary embodiment of a sensor output signal.

FIG. 2A shows an exemplary embodiment of the position sensor 10 and the encoder magnet 50. The position sensor 10 is housed in a package 51. The package 51 may be realized as a dual-in-line package. The dual-in-line package has pins at two sides of the package 51. The package 51 has a mark 52 in one corner of the package 51. The mark 52 is useful for identifying the first pin and the position of the four magneto sensitive elements 11 to 14.

The encoder magnet 50 comprises exactly one South Pole and one North Pole. The encoder magnet 50 may have a cylinder form. The rotation axis of the encoder magnet 50 is perpendicular to the surface of the position sensor 10 and thus perpendicular to the surface of the at least one magneto sensitive element 11 to 14.

In an alternative embodiment, not shown, the package 51 may be fabricated as a quad flat no-leads package, abbreviated QFN package, having terminals on four sides of the package. Such a QFN may be implemented as a micro-leadframe, abbreviated MLF.

Figure 2B:
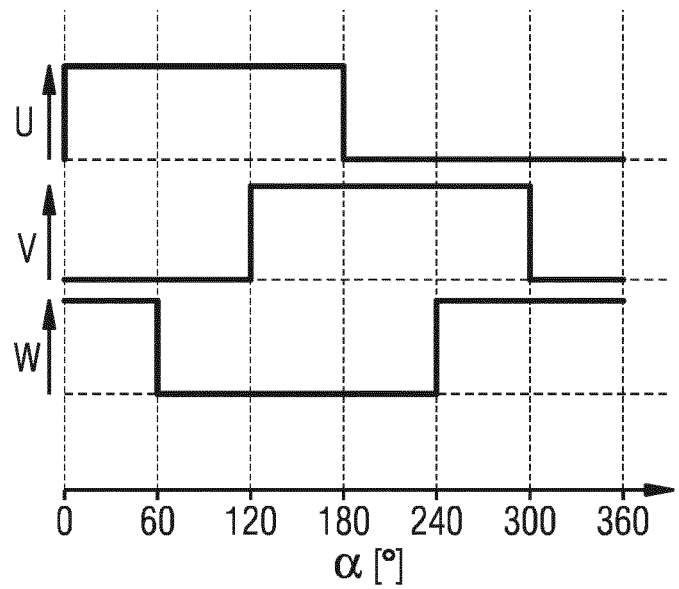

FIG. 2B shows an exemplary embodiment of the absolute sensor output signal, comprising three signals U, V, W, depending on an angle α. A full turn of 360° is shown.

FIG. 3 shows an exemplary embodiment of a motor arrangement 60 comprising the position sensor 10, the encoder magnet 50 and the motor 61. The motor 61 has a rotor 62 and a stator 64, shown in FIGS. 4A and 4B. The rotor 62 of the motor 61 is connected to an axis 63 that is shown on the left and on the right side of the motor 61. The encoder magnet 50 is attached to the axis 63. The cylinder of the encoder magnet 50 is fixed to the axis 63. The rotation axis of the encoder magnet 50 is approximately aligned with the rotation axis of the axis 63. The motor arrangement 60 can also be named motor setup or motor system.

In FIG. 3, the position sensor 10 with the package 51 is skipped for illustration purposes such that the pins of the bus terminal 25, the output terminal 22 and the further output terminal 23 are shown. In reality, the rotation axis of the encoder magnet 50 is perpendicular to the surface of the position sensor 10.

Moreover, the motor arrangement 60 comprises a motor controller 65 that is coupled on its input side to the position sensor 10. Thus, the output terminal 22 and/or the further output terminal 23 of the position sensor 10 are connected to input terminals of the motor controller 65. The motor controller 65 may be implemented as a universal motor controller.

The motor controller 65 comprises an interface 66. The motor controller 65 may comprise a further interface 67. The interface 66 of the motor controller 65 is connected to the output terminal 22 of the position sensor 10. Additionally, the further interface 67 of the motor controller 65 is connected to the further output terminal 23. The motor controller 65 is electrically connected to the motor 61. In the embodiment shown in FIG. 3, the motor 61 has three pole pairs. Thus, the motor controller 65 comprises a first to a third output 68 to 70 that are electrically coupled to the motor 61 via three connection lines. The number of connection lines between the motor 61 and the motor controller 65 is equal or larger than the number of pole pairs of the motor 61. The motor controller 65 is able to control the current flowing through each of the coils or windings of a pole of the motor 61. The motor controller 65 comprises a control input 73. The control input 73 may be connected to a field bus 74 that is coupled to a user interface such as a CAN, USB or RS232 interface.

Additionally, the motor arrangement 60 may comprise a programmer unit 71 that is coupled to the position sensor 10. A programmer bus 72 couples the programmer unit 71 to the bus terminal 25 of the position sensor 10. The programmer bus 72 is implemented as SPI-bus. In the example shown in FIG. 3, the programmer unit 71 has three outputs that are coupled to the three inputs of the bus terminal 25 and one input that is coupled to the output of the bus terminal 25.

The programmer unit 71 generates an output signal MISO setting the position sensor 10 in the calibration mode of operation. The output stimulation unit 17 may generate the set signal ST depending on information provided by the output signal MISO generated from the programmer unit 71. Thus, the sensor output signal SOUT is a function of the set signal ST and is provided to the motor controller 65. Therefore, the motor controller 65 generates motor control signals PH1, PH2, PH3 at the first to the third output 68 to 70 that are provided to the motor 61. Consequently, the motor 61 changes the position of the axis 63 as a function of the motor control signals PH1 to PH3. Thus, the angle α of the axis 63 is a function of the motor control signals PH1 to PH3 which are in turn a function of the sensor output SOUT and thus a function of the set signal ST of the output stimulation unit 17. The set signal ST may be a function of the output signal MISO provided from the programmer unit 71. Alternatively, the set signal ST may be a function of the set data stored in the set data block 29 of the memory 26.

In the calibration mode of operation, the at least one magneto sensitive element 11 to 14 generates the at least one magnetic signal S1 to S4 that is converted into the position signal SP and into the measurement signal SM. The position signal SP and/or the measurement signal SM is provided via the SPI 24 and the bus terminal 25 to the programmer unit 71. Thus, the programmer unit 71 receives the values of the position signal SP and/or the measurement signal SM for the angle α of the axis 63 that is set before by the programmer unit 71. The programmer unit 71 determines the calibration data using the values of the position signal SP and/or the measurement signal SM. The calibration data is provided by the programmer unit 71 via the bus terminal 75 and the SPI 24 to the calibration data block 28 of the memory 26.

In the calibration mode of operation, the programmer unit 71 may set several values of the angle α of the axis 63 of the motor 61 and may receive the values of the position signal SP and/or the measurement signal SM for these values of the angle α. Thus, the programmer unit 71 is able to determine the calibration data for the angle α having the value zero as well as for the information that is used by the linearization unit 30 for generating a linearized measurement signal SM.

In the measurement mode of operation, the programmer unit 71 may be removed from the position sensor 10. In the measurement mode of operation, the motor arrangement 60 comprises the motor 61, the position sensor 10 and the motor controller 65. The motor arrangement 60 may be free of the programmer unit 71 in the measurement mode of operation. The position sensor 10 measures the position of the axis 63, which means the angle α of the axis 63, and generates the sensor output signal SOUT as a function of the measurement signal SM. The sensor output signal SOUT is provided to the motor controller 65. The motor controller 65 determines the motor control signals PH1 to PH3 as a function of the sensor output signal SOUT. Due to the calibration in the calibration mode of operation, the measurement signal SM and the sensor output signal SOUT provide the information that the angle has the value zero only if the angle α of the axis 63 has the value zero. Thus, a high accuracy for mounting the encoder magnet 50 on the axis 63 and for mounting the position sensor 10 on a carrier or housing of the motor 61 is not required, since the calibration mode of operation is used after said mounting steps. Typically, the position of the encoder magnet 50 on the shaft 63 of the motor 61 is unknown during production before calibration.

The motor 61 is controlled via the motor controller 65 that receives commands at the control input 73 of the motor controller 65. The commands may comprise the mode of operation of the motor 61, switching on/off the motor 61, the direction of movement of the axis 63 and/or the value of the rotation speed.

In an embodiment, the position sensor 10 may be set in the calibration mode of operation only once. A further phase in which the motor arrangement 60 is set in the calibration mode of operation is only required if mechanical amendments are performed which change the position of the encoder magnet 50 or of the position sensor 10 relative to the axis 63.

In FIG. 3, the motor arrangement 60 is shown during the calibration phase. The motor arrangement 60 comprises the motor 61, the motor controller 65, the position sensor 10 and the programmer unit 71 in the calibration mode of operation which is designed for zero angle alignment.

The programmer unit 71 is connected via the serial interface 24 (e.g. SPI-Bus) to the position sensor 10. The position sensor 10 is switched from measurement operation to calibration mode. In this mode, the sensor output signal SOUT can be completely controlled via the programmer unit 71. The sensor output signal SOUT may be the absolute sensor output signals UVW and the incremental sensor output signals ABI. The user is able to set the sensor output signal SOUT to defined states and keep the sensor output signal SOUT static. The motor controller 65 itself is in normal operation mode. The phase currents PH1 to PH3 will be induced to the motor 61 and the rotor 62 will line up accordingly to the magnetic field of the stator 64. As long as the sensor output signal SOUT stays in its static configuration, the rotor 62 of the motor 61 will also keep its position. In this state, the angular value of the position sensor 10 can be read from the serial interface 24. This angular value gives the basic information for the required zero angle programming.

The programmer unit 71 may be used for configuration of the position sensor 10, such as for example for selecting whether the pulse-width modulated signal PWM is provided at the output terminal 22 or the further output terminal 23.

A manual force of the sensor output signal SOUT, e.g. the incremental signals ABI and the absolute signals UVW, is applied via the serial interface 24 controlled by the user. In the motor arrangement 60, zero angle alignment is possible.

A storage for calibration points and linearization is performed in the memory 26. The motor 61 is taken as reference for calibration. The motor 61 itself gives reference positions. Optimal current switching points are stored inside the position sensor 10.

A full sequential control of the calibration routine is achieved within the position sensor 10. Just one command is required to start calibration. The position sensor 10 receives a signal setting the position sensor 10 in the calibration mode of operation. In an embodiment, the motor controller 10 does not receive any signal setting the motor controller 10 in the calibration mode of operation besides the incremental and/or the absolute sensor output signals A, B, I; U, V, W.

The programmer unit 71 may generate the sensor output signal SOUT, e.g. realized as stimulated magnetic signals.

Advantageously, the position sensor 10 can be connected to different motor controllers 65, since the position sensor 10 is compatible with different types of the motor controller 65 due to the versatile interface 20 and further interface 21.

In an alternative, not shown embodiment, the sensor output signal SOUT is only provided in one form from the position sensor 10 to the motor controller 65, for example only as the absolute sensor output signal U, V, W. The incremental sensor output signal A, B, I is not required in this embodiment.

FIGS. 4A and 4B show an exemplary embodiment of the motor 61 which is a further development of the above-shown embodiments. In FIGS. 4A and 4B, a schematic of the motor 61 is illustrated.

FIG. 4A shows a normal operation mode of the motor 61. The motor 61 is realized as a brushless DC electric motor, abbreviated BLDC motor. The motor 61 comprises the rotor 62 and the stator 64. The rotor 62 comprises a rotor magnet 82. The rotor magnet 82 is realized as a permanent magnet. Thus, the rotor 62 comprises exactly one rotor pole pair. The rotor magnet 82 is mechanically coupled to the axis 63 that is shown in FIG. 3.

The stator 64 comprises a first number N of stator coils 83 to 85. In FIGS. 4A and 4B, the number N is 3. Thus, the stator 64 comprises a first to a third stator coil 83 to 85. Each of the stator coils 83 to 85 correspond to one pole of the stator 64.

As shown in FIG. 4A, in phase 1, a current PI flows through the first and the second stator coil 83, 84 and generates a resulting stator flux vector SV. The current PI is realized as a phase current. The rotor magnet 82 generates a rotor flux vector RV. The stator flux vector SV runs in front of the rotor flux vector RV. Thus, a rotation direction RD is achieved. The rotation direction RD is shown from the start to the end of the phase 1.

In phase 2, the phase current direction is realized such that the current PI flows through the first and the third stator coil 83, 85. Consequently, the stator flux vector SV moves from the angle shown in phase 1 to the angle shown in phase 2. The rotor flux vector RV moves in the rotation direction RD. In phase 3 the current PI flows through the second and the third stator coil 84, 85, whereas in phase 4 the current PI flows through the second and the first stator coil 84, 83. The current PI has the opposite direction in phase 4 in comparison to phase 1. In phase 5 the current PI flows through the third and the first stator coil 85, 83, whereas in phase 6 the current PI flows through the third and the second stator coil 85, 84. Thus, one complete 360° rotation of the stator flux vector SV, and thus of rotor magnet 82, and consequently of the axis 63, is achieved.

The motor 61 comprises six phase current switching points 86 to 91. When the rotor 62, and thus the rotor flux vector RV, approaches one of the phase current switching points 86 to 91 the phase current direction is changed and, thus, the resulting stator flux vector SV is changed. For example, when the rotor flux vector RV in phase 1 approaches the first phase current switching point 86, the flow of the current PI is changed from the situation shown in phase 1 to the situation shown in phase 2. The magnetic field of the stator 64 runs in front of the magnetic field of the rotor 62. A rotation of the rotor 62 is achieved by generating an attracting force between a stator coil 83 to 85 or stator pole of the stator 64 to the rotor magnet 82. Thus, the stator poles 83 to 85 generate a rotating magnetic field which forces the rotor magnet 82 to rotate.

In FIGS. 4A and 4B, a BLDC vector diagram is illustrated. In FIG. 4A, the different phases of BLDC commutation are shown. As an example, a 1-pole pair motor 61 is taken, but the method can be performed for any number of pole pairs. As an example the motor 61 is driven in block commutation, therefore six phase current switching points 86 to 91 occur.

In FIG. 4A, the configuration represents the normal operation mode. The motor 61 is driven in block (trapezoidal) commutation method. The stator flux vector SV is always ahead of the rotor flux vector RV from 120° to 60°. The angle position α of the rotor 62 is permanently measured. The motor control unit, abbreviated MCU, also called motor controller 65, is switching the phase currents PI related to the position feedback and takes care that the angle difference between the stator flux vector SV and the rotor flux vector RV stays in the appropriate range. In the motor commutated vector orientated control mode, the controller 65 takes care that the stator to rotor flux angle stays always at 90°. Therefore, a high-resolution position feedback of the rotor 62 is required, but the method is the same.

In an alternative, not-shown embodiment, the rotor 62 comprises more than one pole pairs. The rotor 62 may comprise more than one rotor magnet 82.

In an alternative, not-shown, embodiment, the first number N of stator coils 83 to 85 may be larger than 3.

FIG. 4B shows the motor 61 as illustrated in FIG. 4A in a calibration mode. The current PI flows through the first and the second stator coil 83, 84 in phase 1 of the calibration mode. The current flow results in the same resulting stator flux vector SV in phase 1 of the calibration mode as shown in phase 1 of the normal operation mode. The rotor magnet 82 orients its rotor flux vector RV in the direction of the stator flux vector SV. The current PI and thus the stator flux vector SV is controlled by the motor controller 65 that in turn is controlled by the position sensor 10. Thus, the position sensor 10 sets the first calibration point. The encoder magnet 50 on the axis 63 generates the magnetic signals S1 to S4 for this calibration point. Thus, the position sensor 10 is configured to determine the magnetic signals S1 to S4 and the signals resulting from the magnetic signals S1 to S4 such as the digital magnetic signals SD1 to SD4, the position signal SP and/or the measurement signal SM at the first calibration point.

In a second calibration point shown in phase 2, the current PI flows through the first and the third stator coil 83, 85. The rotor flux vector RV is also on the stator flux vector SV after a short adjustment time. Thus, the magnetic signals S1 to S4 can be determined for the second calibration point. A third to a sixth calibration point can be realized by phase 3 to phase 6. In these phases 3 to 6, the current PI flows through the stator coils 83 to 85 such as shown in FIG. 4B. The phases 1 to 6 in the calibration mode correspond to the phases 1 to 6 in the normal operation mode shown in FIG. 4A. In the example shown in FIGS. 4A and 4B, six calibration points are realized. The calibration points are equal to the phase current switching points 86 to 91. Thus, the switching from one phase to the next phase in the normal operation of the motor 61 is realized with high accuracy.

In FIG. 4B, the diagrams represent the same motor 61 driven in the calibration mode.

That means that the measured rotor angle is not taken as direct feedback, because the forced output signals are forced to a certain position and are not representing the real measured angle. As a result, the MCU 65 is not generating a rotating field, but the stator flux vector SV sticks at certain positions. The rotor 62 follows the stator flux vector SV and will be lined up immediately. At this static position, the rotor angle α is measured by the position sensor 10 and is taken as reference value. This procedure can be repeated at several positions over one rotation. In FIG. 4B, the six reference positions 86 to 91, which are given in block commutation mode, are shown.

In the calibration mode of operation, the following steps may be performed: First, a constant current PI (or constant currents) are forced or set to at least one stator coil 83 to 85. The rotor 62 will line up and stick in this position. The position of the rotor 62 is known due to the current pattern in the stator coils 83 to 85 of the stator 64. The position of the position sensor 10 can be read e.g. by reading the position signal SP and/or the measurement signal SM. The procedure is repeated for every coil setting over one full rotation of the axis 63. Finally, the measured position and offset angle can be programmed.

The output stimulation unit 17 may be understood as a unit having an output. The set signal ST may be understood as a signal. The measurement mode may be understood as a standard operation mode. The set data may be understood as data.

The invention claimed is:

1. A position sensor, comprising:
   at least one magneto sensitive element,
   a signal evaluation circuit that is coupled to the at least one magneto sensitive element and is configured to generate a measurement signal,
   an output stimulation circuit configured to generate a set signal, and
   an interface circuit that is coupled at its input side to the signal evaluation circuit and to the output stimulation circuit, and is configured to provide a sensor output signal depending on the measurement signal in a measurement mode of operation and depending on the set signal in a calibration mode of operation, and wherein the interface circuit comprises a multiplexer having:
   a first input coupled to the signal evaluation circuit,
   a second input coupled to the output stimulation circuit,
   an output coupled to an interface of the interface circuit, and
   a control terminal configured to receive a multiplex control signal.

2. The position sensor according to claim 1,
   wherein the position sensor comprises a semiconductor body and the at least one magneto sensitive element, the signal evaluation circuit, the output stimulation circuit and the interface circuit are realized on a first main surface of the semiconductor body.

3. The position sensor according to claim 1,
   wherein the interface is realized as an element of a group comprising an incremental interface, an absolute interface and a pulse-width modulator decoder.

4. The position sensor according to claim 1,
   wherein the position sensor comprises a bus terminal and a serial peripheral interface that is connected to the bus terminal and to the output stimulation circuit, and
   wherein the output stimulation circuit is configured to provide the set signal depending on set data received from the bus terminal via the serial peripheral interface.

5. The position sensor according to claim 1,
   wherein the position sensor comprises a memory that comprises a set data block and is coupled to the output stimulation circuit, and
   wherein the output stimulation circuit is configured to provide the set signal depending on set data stored in the set data block.

6. The position sensor according to claim 5,
   wherein the memory is implemented as a one-time programmable memory or as an electrically erasable programmable read-only memory.

7. The position sensor according to claim 1,
   wherein the signal evaluation circuit comprises a linearization circuit that is coupled on its output side to the interface circuit, and
   wherein the position sensor comprises a memory with a calibration data block that is coupled to the linearization circuit for providing calibration data stored in the linearization data block to the linearization circuit in the measurement mode of operation.

8. The position sensor according to claim 7,
   wherein the position sensor is configured to store the calibration data in the calibration data block of the memory in the calibration mode of operation.

9. The position sensor according to claim 7,
   wherein the calibration data is determined in the calibration mode of operation such that the measurement signal represents a zero position in the measurement mode of operation at a single alignment between the position sensor and a device, the position of which is to be measured in the measurement mode of operation.

10. The position-sensor according to claim 7,
    wherein the linearization circuit is configured to provide the measurement signal by linearization of an input signal of the linearization circuit using the calibration data.

11. The position sensor according to claim 1,
    wherein the position sensor is implemented as an angle position sensor and the measurement signal represents an angle information.

12. The position sensor according to claim 1,
wherein the at least one magneto sensitive element is realized as a Hall element.

13. A motor arrangement, comprising:
a motor with a rotor and a stator,
an encoder magnet mechanically coupled to the rotor for generating a magnetic field,
a motor controller electrically coupled to the stator, and
a position sensor that is arranged in the magnetic field of the encoder magnet and is electrically coupled to the motor controller for providing the sensor output signal to the motor controller,
wherein the position sensor comprises:
  at least one magneto sensitive element,
  a signal evaluation circuit that is coupled to the at least one magneto sensitive element and is configured to generate a measurement signal,
  an output stimulation circuit configured to generate a set signal, and
  an interface circuit configured to provide the sensor output signal depending on the measurement signal in a measurement mode of operation and depending on the set signal in a calibration mode of operation, wherein the interface circuit comprises a multiplexer having:
    a first input coupled to the signal evaluation circuit,
    a second input coupled to the output stimulation circuit,
    an output coupled to an interface of the interface circuit, and
    a control terminal configured to receive a multiplex control signal.

14. A method for generating a sensor output signal, comprising:
generating at least a magnetic signal by at least one magneto sensitive element,
generating a measurement signal by a signal evaluation circuit as a function of the at least one magnetic signal,
providing a set signal by an output stimulation circuit, and
providing the sensor output signal by an interface circuit depending on the measurement signal in a measurement mode of operation and depending on the set signal in a calibration mode of operation, wherein the interface circuit comprises a multiplexer having:
  a first input coupled to the signal evaluation circuit,
  a second input coupled to the output stimulation circuit,
  an output coupled to an interface of the interface circuit, and
  a control terminal configured to receive a multiplex control signal.

15. The method-according to claim 14,
wherein the at least one magneto sensitive element, the signal evaluation circuit, the output stimulation circuit and the interface circuit are realized on a first main surface of a semiconductor body.

\* \* \* \* \*